US009502698B2

(12) United States Patent
Takahashi et al.

(10) Patent No.: US 9,502,698 B2
(45) Date of Patent: Nov. 22, 2016

(54) NON-AQUEOUS ELECTROLYTE BATTERY

(71) Applicant: Panasonic Intellectual Property Management Co., Ltd., Osaka (JP)

(72) Inventors: Tadayoshi Takahashi, Osaka (JP); Kanji Kawakami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 7 days.

(21) Appl. No.: 14/423,000

(22) PCT Filed: Sep. 20, 2013

(86) PCT No.: PCT/JP2013/005580
§ 371 (c)(1),
(2) Date: Feb. 20, 2015

(87) PCT Pub. No.: WO2014/050056
PCT Pub. Date: Apr. 3, 2014

(65) Prior Publication Data
US 2015/0243942 A1 Aug. 27, 2015

(30) Foreign Application Priority Data
Sep. 28, 2012 (JP) .................................. 2012-215895

(51) Int. Cl.
*H01M 2/08* (2006.01)
*H01M 10/052* (2010.01)
(Continued)

(52) U.S. Cl.
CPC ................ *H01M 2/08* (2013.01); *H01M 2/02* (2013.01); *H01M 2/0202* (2013.01);
(Continued)

(58) Field of Classification Search
CPC ...................................................... H01M 2/08
See application file for complete search history.

(56) References Cited

U.S. PATENT DOCUMENTS

| 5,656,392 A * | 8/1997 | Sano | H01M 2/027 204/252 |
| 2008/0166631 A1* | 7/2008 | Takahashi | H01M 2/08 429/185 |
| 2011/0052977 A1* | 3/2011 | Kurata | H01M 2/06 429/179 |

FOREIGN PATENT DOCUMENTS

| JP | 09-306445 A | 11/1997 |
| JP | 2003-077432 A | 3/2003 |

(Continued)

OTHER PUBLICATIONS

International Search Report issued in International Application No. PCT/JP2013/005580 dated Nov. 18, 2013, with English translation.

*Primary Examiner* — Stewart Fraser
*Assistant Examiner* — Olatunji Godo
(74) *Attorney, Agent, or Firm* — McDermott Will & Emery LLP

(57) ABSTRACT

Provided is a non-aqueous electrolyte battery including: a power-generating element; and a battery container configured to house the power-generating element. The power-generating element includes: a positive electrode; a negative electrode; a separator interposed between the positive and negative electrodes; and a non-aqueous electrolyte. The battery container includes: a battery case having an opening; a sealing plate configured to close the opening; and a gasket interposed between the battery case and the sealing plate. The gasket includes a PFA resin being a copolymer of tetrafluoroethylene and perfluoroalkyl vinyl ether, and at least a part of the PFA resin has undergone a melting treatment 2 to 20 times to be a first component. The melting treatment includes heating the PFA resin to a melting temperature of 310° C. to 450° C. for melting and then cooling the PFA resin back to a solid.

11 Claims, 2 Drawing Sheets

(51) Int. Cl.
*H01M 2/04* (2006.01)
*H01M 2/02* (2006.01)

(52) U.S. Cl.
CPC ....... *H01M 2/0237* (2013.01); *H01M 2/0413* (2013.01); *H01M 10/052* (2013.01); *H01M 2/0222* (2013.01); *H01M 2/0465* (2013.01); *H01M 2220/20* (2013.01); *H01M 2220/30* (2013.01); *Y02E 60/122* (2013.01)

(56) References Cited

FOREIGN PATENT DOCUMENTS

| | | |
|---|---|---|
| JP | 2006-147159 A | 6/2006 |
| JP | 2009-146690 A | 7/2009 |
| JP | 2010-056079 A | 3/2010 |
| JP | 2011-071003 A | 4/2011 |

\* cited by examiner

NON-AQUEOUS ELECTROLYTE BATTERY

RELATED APPLICATIONS

This application is the U.S. National Phase under 35 U.S.C. §371 of International Application No. PCT/JP2013/005580, filed on Sep. 20, 2013, which in turn claims the benefit of Japanese Application No. 2012-215895, filed on Sep. 28, 2012, the disclosures of which are incorporated by reference herein.

TECHNICAL FIELD

The present invention relates to a non-aqueous electrolyte battery using a copolymer (PFA resin) of tetrafluoroethylene and perfluoroalkyl vinyl ether as a gasket.

BACKGROUND ART

Non-aqueous electrolyte batteries including an organic solvent such as lithium-ion batteries have a higher energy density and a wider operating temperature range, compared to batteries including an aqueous solution such as alkaline batteries and nickel-metal hydride secondary batteries. In recent years, due to rapid progression in technology in the electronics field, miniaturization of electronic devices is increasing. With such miniaturization, demand is increasing for small and lightweight non-aqueous electrolyte batteries having a high energy density, for use as the power source for electronic devices. Specifically, for mobile phones and laptop computers, cylindrical or prismatic lithium-ion secondary batteries are used; and for calculators and wristwatches, coin-shaped lithium batteries are used as the main power source. Furthermore, lithium-ion batteries are beginning to be used as the power source for electric vehicles (EV) and hybrid electric vehicles (HEV). With the above in high demand, high and long-term reliability is expected of non-aqueous electrolyte batteries.

For the sealing portion of coin-shaped as well as cylindrical non-aqueous electrolyte batteries, a gasket formed of a widely-used resin such as polypropylene or polyethylene is used. However, in contrast to batteries including an aqueous solution, non-aqueous electrolyte batteries are very sensitive to moisture, and entry of moisture from the outside causes early degradation of battery characteristics.

For example, lithium-ion secondary batteries use a positive electrode active material with a high potential of 4 V or more relative to lithium metal; and use $LiPF_6$ or $LiBF_4$ as the supporting salt in the electrolyte, in view of tolerance to such high potential. Such supporting salt has high reactivity with moisture; and the strong acid produced by a reaction causes degradation of battery performance. In the case of batteries including lithium metal, a reaction between lithium and moisture causes loss of lithium activity and degradation of battery performance.

Thus, there has been a study to use a copolymer (PFA resin) of tetrafluoroethylene and perfluoroalkyl vinyl ether with low moisture vapor permeability as the gasket, to prevent entry of moisture from the outside into the battery (see Patent Literature 1). There has also been a study to determine the fluorine content in the PFA resin and the melt flow rate range of the PFA resin, to improve battery characteristics in a high humidity environment as well as improving the leak-proof characteristic (see Patent Literature 2).

PRIOR ART

Patent Literature

[Patent Literature 1] Japanese Laid-Open Patent Publication No. 2006-147159
[Patent Literature 2] Japanese Laid-Open Patent Publication No. 2010-56079

SUMMARY OF INVENTION

Technical Problem

However, when a non-aqueous electrolyte battery is intended for use in an EV or HEV for example, the battery is required to be reliable in an environment at a severe temperature or humidity unexpected in the past. Moreover, with increased functionality of electronic devices, there is a gradual increase in demand for a non-aqueous electrolyte battery with longer life.

In order for a non-aqueous electrolyte battery to secure high reliability, entry of moisture into the battery needs to be greatly suppressed. For that purpose, it is insufficient to just use a PFA resin with low moisture vapor permeability as a gasket. Therefore, further improvement is expected.

Solution to Problem

One aspect of the present invention relates to a non-aqueous electrolyte battery including:
  a power-generating element; and
  a battery container configured to house the power-generating element,
  the power-generating element including:
    a positive electrode;
    a negative electrode;
    a separator interposed between the positive electrode and the negative electrode; and
    a non-aqueous electrolyte,
  the battery container including:
    a battery case having an opening;
    a sealing plate configured to close the opening; and
    a gasket interposed between the battery case and the sealing plate,
  the gasket including a copolymer (PFA resin) of tetrafluoroethylene and perfluoroalkyl vinyl ether,
  at least a part of the PFA resin having undergone a melting treatment 2 to 20 times to be a first component, and
  the melting treatment including melting the PFA resin by heating at a melting temperature of 310° C. to 450° C. and then cooling the PFA resin back to a solid.

Advantageous Effect of Invention

According to the above aspect of the present invention, for a non-aqueous electrolyte battery, entry of moisture from the sealing portion, i.e., the gasket, can be reduced significantly. Thus, there can be provided a highly reliable non-aqueous electrolyte battery.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
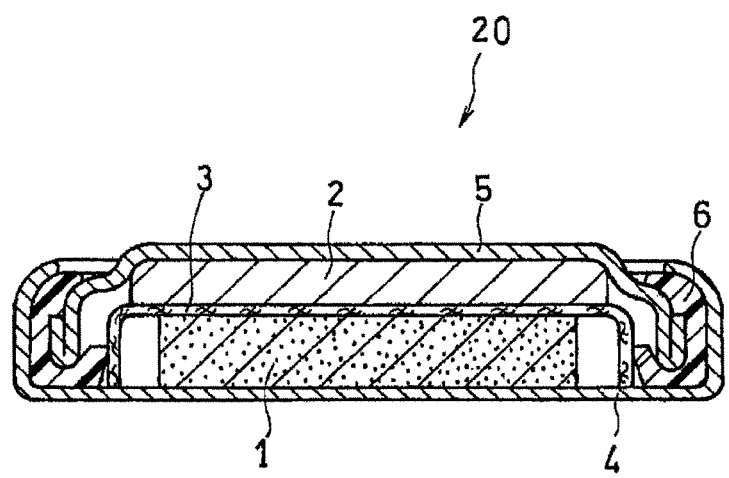
FIG. 1 is a vertical sectional view of a coin-shaped non-aqueous electrolyte battery according to an embodiment of the present invention.

A non-aqueous electrolyte battery of the present invention includes: a power-generating element; and a battery container configured to house the power-generating element. The power-generating element includes: a positive electrode; a negative electrode; a separator interposed between the positive and negative electrodes; and a non-aqueous electrolyte. The battery container includes: a battery case having an opening; a sealing plate configured to close the opening; and a gasket interposed between the battery case and the sealing plate.

The gasket includes a PFA resin, i.e., a copolymer of tetrafluoroethylene and perfluoroalkyl vinyl ether. The PFA resin may include a third member in addition to the tetrafluoroethylene units and the perfluoroalkyl vinyl ether units. However, the proportion of the third member is preferably, for example, 30 mol % or less relative to the total of the tetrafluoroethylene units and the perfluoroalkyl vinyl ether units. The kind of perfluoroalkyl group in the perfluoroalkyl vinyl ether is not particularly limited, and is preferably, for example, a trifluoromethyl group or a tetrafluoroethyl group.

At least a part of the PFA resin has undergone a melting treatment 2 to 20 times to be a first component. This significantly suppresses entry of moisture into the battery, even when the battery is used in a high humidity environment for a long period of time.

In view of securing long-term reliability, the proportion of the PFA resin in the material forming the gasket (hereafter referred to as gasket material) is preferably as large as possible. The proportion of the PFA resin in the gasket material is, for example, preferably 80 mass % or more, further preferably 90 mass % or more, and particularly preferably 95 mass % or more.

The melting treatment includes heating and melting the PFA resin and then cooling the PFA resin back to a solid. When melting the PFA resin, the melting temperature of the PFA resin is set to 310° C. to 450° C., preferably 340° C. to 420° C., and further preferably 340° C. to 400° C. The melting temperature not only includes the temperature at which the PFA resin completely melts, but also the temperature at which the PFA resin turns into a gel and becomes moldable by a molding process such as injection molding.

By the melting treatment, hydrophilicity of the PFA resin can be reduced and hydrophobization of the gasket progresses. By the melting temperature of the PFA resin set to 310° C. to 450° C., the mechanical strength of the PFA resin is maintained. Each time the melting treatment is conducted, the PFA resin is given a thermal history at 310° C. to 450° C.

The initial melting treatment includes heating and melting the PFA resin as a virgin material and then cooling the PFA resin back to a solid. Here, virgin material refers to the PFA resin in the same state as when first obtained from the resin manufacturer. The virgin material is usually a particulate matter such as beads or pellets.

Specific examples of the virgin material obtained from the resin manufacturer include: "NEOFLON™ PFA" available from Daikin Industries, Ltd.; "Fluon™ PFA" available from Asahi Glass Co., Ltd.; and "TEFLON™ PFA" available from Du Pont-Mitsui Fluorochemicals Co., Ltd.

Per the melting treatment, the heating time for the PFA resin at the melting temperature is preferably 5 minutes or less and further preferably 3 minutes or less. By the heating time per the melting treatment set in the above range, the mechanical strength of the PFA resin becomes easily maintainable in a more favorable range, even when the melting treatment is repeated 2 to 20 times. Moreover, the hydrophilicity of the PFA resin is dominantly influenced more by the number of times the melting treatment is conducted, than the heating time in total. The heating time is not particularly limited, and may be, for example, 60 seconds or more.

The PFA resin can further include a second component in addition to the first component. When included, the amount of the second component relative to the total of the first component and the second component is preferably 90 mass % or less. The amount of the second component being 90 mass % or less prevents significant reduction in the effect of hydrophobization of the gasket by the first component. However, in view of increasing the effect of hydrophobization by the first component, the amount of the second component is further preferably 80 mass % or less, still further preferably 60 mass % or less, and particularly preferably 40 mass % or less. The amount of the second component relative to the total of the first component and the second component can be, for example, 1 mass % or more.

The melt flow rate (MFR) of the PFA resin as the virgin material prior to the melting treatment is preferably 20 g/10 min to 40 g/10 min. By the MFR being 20 g/10 min or more, distortion of the gasket after production can be reduced. Thus, good battery characteristics become easily obtainable in a high temperature and high humidity environment. By the MFR being 40 g/10 min or less, degradation of the mechanical properties of the PFA resin can be suppressed, even when the melting treatment is repeatedly conducted to obtain the first component. Thus, since the tensile strength and the repulsion force of the gasket are maintained, good battery characteristics becomes easily obtainable even in a high temperature and high humidity environment. Further preferably, the MFR is 23 g/10 min to 37 g/10 min. For example, when the melting temperature is 380° C., the MFR of the PFA resin is stable for about 30 minutes at least.

The MFR is measured in compliance with the ASTM D3307 test method. Specifically, the MFR is the mass (g/10 min) of the PFA resin with a temperature of 372° C. that flows out from a nozzle 2 mm in inner diameter and 8 mm in length under a load of 5 kg, every 10 minutes.

A sealant is preferably provided at a first bonding interface between the battery case and the gasket and at a second bonding interface between the sealing plate and the gasket. The sealant preferably includes a rubber component. This significantly improves the hermeticity at the first bonding interface and at the second bonding interface.

Next, a detailed description will be given of an embodiment of the present invention.

[PFA Resin]

Among fluorocarbon resins, a PFA resin has a large fluorine content and is an excellent material with low moisture vapor permeability. Moreover, among injection moldable fluorocarbon resins, a PFA resin is believed to have the largest fluorine content. The method of injection molding is excellent in productivity and capable of significant cost reduction and bulk production. Thus, in selecting a gasket material, injection moldability is an important factor for determination.

Due to the foregoing, a PFA resin is suitable as a gasket material in a non-aqueous electrolyte battery requiring long-term reliability. However, since a PFA resin has a hydrophilic group such as a carboxyl group (—COOH), a hydroxyl group (—OH), or an amino group (—NH$_2$) as an end group, moisture tends to be adsorbed onto the gasket surface. The moisture adsorbed onto the gasket surface facilitates entry of moisture into the battery via over the gasket surface. Thus, it is difficult to greatly suppress entry of moisture from the outside into the battery, by using only a PFA resin. Particularly, when the battery is for use in a high humidity environment over a long period of time, the battery would become greatly affected by the entry of moisture via trickling over the gasket surface. This would cause difficulty in securing reliability for the battery.

Here, when a PFA resin is used as a gasket material, it is common to use 100% a second component obtained by a melting treatment at 310° C. to 450° C. conducted only once on a PFA resin as a virgin material in the form of beads or pellets. However, it has become clear that by replacing at least a part of the second component with a first component obtained by a melting treatment at 310° C. to 450° C. conducted on a PFA resin 2 to 20 times, entry of moisture into the battery can be suppressed significantly even when the battery is used in a high humidity environment over a long period of time.

In the melting treatment, a PFA resin is heated to a melting temperature of 310° C. to 450° C., preferably 340° C. to 420° C., and further preferably 340° C. to 400° C. for melting; and then cooled back to a solid. For example, when a gasket is produced by melting a PFA resin as a virgin material at the foregoing temperature and then conducting injection molding, the gasket obtained and the waste material of the PFA resin also obtained at that time are formed of the second component being the result of the melting treatment conducted once.

When a gasket is produced again from a material obtained by pulverizing or pelletizing the gasket produced by injection molding and the waste material also produced at that time, the gasket obtained is formed of the first material being the result of the melting treatment conducted 2 or 3 times.

Furthermore, a gasket produced by injection molding using a mixture of a PFA resin having undergone the melting treatment once or more and a PFA resin not having undergone the melting treatment even once, is formed of a composite of the first component and the second component.

The melting treatment does not necessarily have to be conducted on a PFA resin in a gasket producing process such as injection molding, and may be conducted in another process. That is, a gasket may be produced by an arbitrary method using the first component prepared in advance.

Mixing of a PFA resin having undergone the melting treatment once or more and a PFA resin not having undergone the melting treatment can be conducted during a gasket producing process (e.g., inside an injector provided in an injection molding machine), or by another process. The first component may be a mixture of PFA resins each differing in the number of times the melting treatment is conducted.

Usually, when a thermal history is given to a polymeric resin, division of the main chain may dominantly occur due to thermal energy. This would lead to degradation of mechanical strength such as bending strength and tensile strength. Therefore, when a polymeric resin with a thermal history is used as a gasket material, cracks may occur in the resultant gasket, or the pressure resistance of the sealing portion may become lower. This would lead to lowering of long-term reliability.

However, in the case of a PFA resin, by the melting treatment, the main chain divides whereas the end groups bond together. This maintains the mechanical strength with not much apparent change in molecular weight. Moreover, since the end groups bond together while decomposition occurs, at least a part of hydrophilic groups (e.g., groups containing an H atom) to which moisture adsorbs is removed and hydrophilicity is reduced. For example, when carboxyl groups (—COOH) bond together after decomposition, the end groups produce (—COOOH—) and become parts of the main chain, while H$_2$O separates from the main chain. On the other hand, since the end groups of the divided main chain each produce a —CF=CF$_2$ group that is hydrophobic, the hydrophilicity of the molecules in total becomes low. This suppresses adsorption of moisture onto the gasket surface.

The extent to which the end groups bond together depends on the temperature and the number of times of the melting treatment conducted on a PFA resin. The higher the temperature is raised for the PFA resin, the more bonding there are between the end groups. When the melting treatment is conducted at 310° C., the number of times presumably needs to be twice or more to make the PFA resin sufficiently hydrophobic.

If the melting treatment is continued even after all of the end groups are bonded, division of the main chain dominantly occurs. This leads to degradation of mechanical strength. When the melting treatment is conducted at a temperature exceeding 450° C., it would be difficult to obtain a sufficient pressure resistance for the sealing portion.

Use of a gasket including the first component, i.e., a PFA resin having undergone the melting treatment twice or more, results in a highly reliable battery even when used in a high humidity environment for a long period of time. This is because moisture that adsorbs onto the gasket surface becomes less due to reduction of the hydrophilic end groups in the PFA resin, and entry of moisture into the battery via trickling over the gasket surface becomes suppressed.

When the gasket includes the second component, although details are unknown, it is presumed that the PFA resin (e.g., second component) having the hydrophilic end groups is present within the gasket, whereas the hydrophobic PFA resin (first component) is distributed in the surface portion of the gasket. Thus, even with a relatively small proportion of the first component, good battery characteristics are presumably obtained in a high humidity environment.

As above, by use of a PFA resin having undergone the melting treatment twice or more as at least apart of the gasket material, battery characteristics in a high temperature and high humidity environment can be improved. However, the hermeticity tends to be weak at the first bonding interface between the battery case and the gasket and at the second bonding interface between the sealing plate and the gasket. Therefore, a sealant is preferably provided at the first and second bonding interfaces. This significantly improves hermeticity at the first and second bonding interfaces.

The sealant preferably includes a rubber component such as butyl rubber, styrene-butadiene rubber, or fluorocarbon rubber. Such sealant has better adhesion to a PFA resin, compared to a more commonly used pitch material including blown asphalt. Thus, compared to use of a pitch material, use of the sealant including a rubber component produces greater effect of improvement in battery characteristics in a high temperature and high humidity environment.

Next, a more detailed description will be given of the embodiment of the present invention. However, note that the following embodiment of the present invention is merely an example, and does not limit the technical scope of the present invention.

FIG. 1 is a vertical sectional view of a coin-shaped (flat) non-aqueous electrolyte battery according to an embodiment of the present invention. A coin-shaped battery 20 includes: a power-generating element; and a battery container configured to house the power-generating element. The power-generating element includes: a positive electrode 1 with a coin shape; a negative electrode 2 with a coin shape; a separator 3 interposed between the positive electrode 1 and the negative electrode 2; and a non-aqueous electrolyte (not illustrated). The battery container includes: a battery case 4 serving as a positive terminal; a sealing plate 5 serving as a negative terminal; and a gasket 6 interposed between the battery case 4 and the sealing plate 5 to separate the two. On the inner surface of the battery case 4 and that of the sealing plate 5, a current-collecting layer (not illustrated) of a conductive material may be formed.

Figure 2:
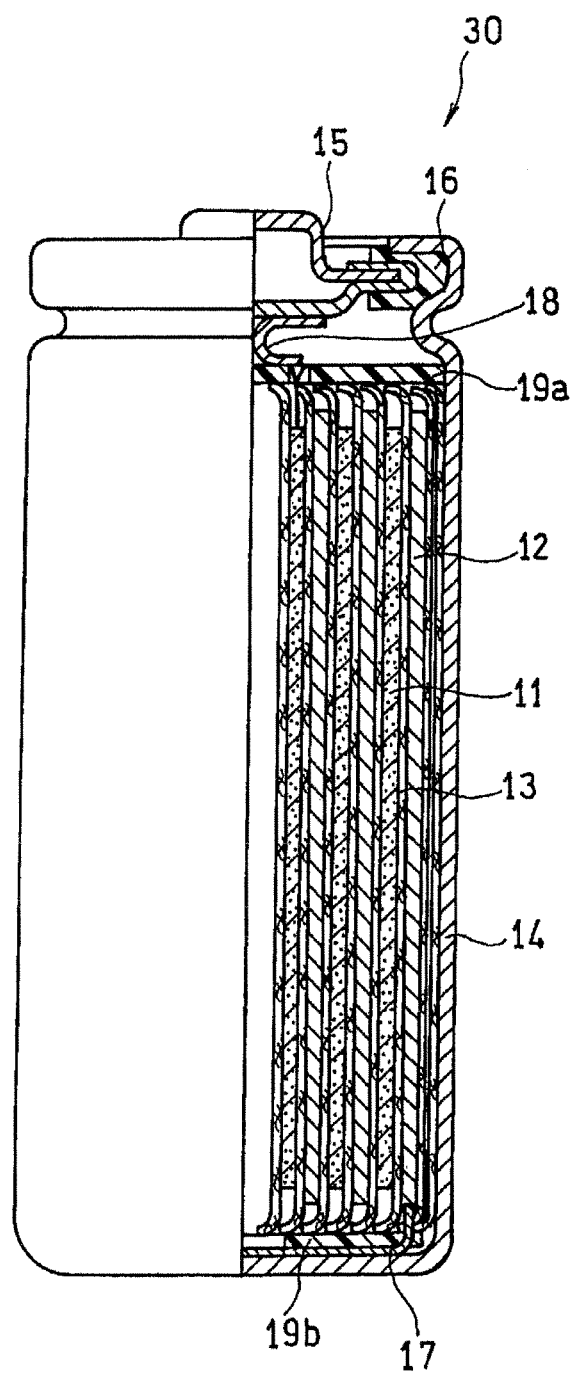
FIG. 2 is a vertical sectional view of a cylindrical non-aqueous electrolyte battery according to another embodiment of the present invention.

FIG. 2 is a vertical sectional view of a cylindrical non-aqueous electrolyte battery according to another embodiment of the present invention. A cylindrical battery 30 includes: a power-generating element; and a battery container configured to house the power-generating element. The power-generating element includes: an electrode assembly; and a non-aqueous electrolyte (not illustrated) with which the electrode assembly is impregnated. The electrode assembly is formed by winding a positive electrode 11 in strip form and a negative electrode 12 in strip form, with a separator 13 interposed therebetween. The battery container includes: a battery case 14 provided with a negative terminal; a sealing plate 15 provided with a positive terminal; and a gasket 16 interposed between the battery case 14 and the sealing plate 15 to separate the two. The negative electrode 12 and the battery case 14 are connected via a negative electrode lead 17. The sealing plate 15 provided with the positive terminal is attached at the upper portion of the battery case 14. The positive electrode 11 and the sealing plate 15 are connected via a positive electrode lead 18. An upper insulating plate 19a and a lower insulating plate 19b are disposed at the upper portion and the lower portion, respectively, of the electrode assembly, to prevent an internal short circuit.

The gasket 6 (16) includes a first component produced by subjecting a PFA resin as a virgin material 2 to 20 times to a melting treatment at 310° C. to 450° C. One hundred percent of the gasket 6 (16) may be formed of the first component; but 1% or more thereof may be formed of a second component, for example.

The positive electrode 1 (11) is, for example, a compression-molded body of a positive electrode material mixture containing a positive electrode active material, a conductive agent, and a binder. The positive electrode active material is selected according to the kind of primary or secondary battery that is desired. Examples of the positive electrode active material include: metal oxides such as $LiCoO_2$, $LiNiO_2$, $LiNi_xCo_{1-x}O_2$, $LiNi_xMn_yCo_{1-x-y}O_2$, $MnO_2$, and $V_2O_5$; metal sulfides such as $TiS_2$ and $FeS_2$; fluorinated graphite; sulfur; and polymers. Examples of the conductive agent include carbon materials such as graphite and carbon black. Examples of the binder include polytetrafluoroethylene (PTFE), polyvinylidene fluoride (PVDF), styrene-butadiene rubber (SBR), and polyacrylic acid.

When forming a coin-shaped battery, the positive electrode material mixture is formed into a coin-shaped pellet. In contrast, when forming a cylindrical or prismatic battery, the positive electrode material mixture is applied to a support, followed by pressing, to produce a positive electrode in strip form. Examples of the support include a metal foil and an expanded metal. Examples of the support material include aluminum and stainless steel.

The negative electrode 2 (12) is, for example: a compression-molded body of a negative electrode material mixture containing a negative electrode active material, a conductive agent, and a binder; or the negative electrode active material (metal) itself in sheet form. The negative electrode active material is selected according to the kind of primary or secondary battery that is desired. Examples of the negative electrode active material include: lithium metal; lithium alloys such as lithium-aluminum alloy, lithium-tin alloy, and lithium-silicon alloy; oxides such as $SnO$, $SnO_2$, $SiO$, $SiO_2$, and $Li_4Ti_5O_{12}$; and carbon materials such as natural graphite and artificial graphite. Examples of the conductive agent include carbon materials such as graphite and carbon black. Examples of the binder include PTFE, PVDF, SBR, polyacrylic acid, and polyimide.

When forming a coin-shaped battery, the negative electrode material mixture is formed into a pellet. Moreover, the lithium metal or alloy is punched to obtain a coin-shaped piece. In contrast, when forming a cylindrical or prismatic battery, the negative electrode material mixture is applied to a support, followed by pressing, to produce a negative electrode in strip form. Examples of the support include a metal foil and an expanded metal. Examples of the support material include copper and nickel. The lithium metal or alloy may be formed into a strip.

The separator 3 (13) can be, for example, a conventionally-used microporous membrane or non-woven fabric. Examples of the separator material include: polyolefins such as polyethylene and polypropylene; cellulose materials; and engineering plastics such as polyphenylene sulfide.

The non-aqueous electrolyte includes: a non-aqueous solvent; and a supporting salt dissolved therein.

Examples of the supporting salt include $LiPF_6$, $LiBF_4$, $LiClO_4$, $LiCF_3SO_3$, $LiAsF_6$, $LiN(CF_3SO_2)_2$, and $LiN(C_2F_5SO_2)_2$. These may be used singly or in a combination of two or more.

Examples of the non-aqueous solvent include propylene carbonate, ethylene carbonate, butylene carbonate, vinylene carbonate, dimethyl carbonate, diethyl carbonate, ethyl methyl carbonate, sulfolane, dimethoxyethane, diethoxyethane, tetrahydrofuran, dioxolane, and γ-butyrolactone. These may be used singly or in a combination of two or more.

The shape and kind of the battery are not particularly limited, and the present invention can be applied to batteries which use a gasket at a sealing portion, such as coin-shaped (flat) batteries, cylindrical batteries, and pin-type batteries, and particularly, batteries having a crimp sealing structure. Here, a crimp sealing structure is a sealing structure including: a battery case with an opening; a sealing plate configured to close the opening; and a gasket interposed between the battery case and the sealing plate. In this structure, the edge portion of the opening of the battery case is pressed toward the peripheral edge portion of the sealing plate, with the gasket in between, so that hermeticity is secured.

Example 1

Battery 1

$LiCoO_2$ as a positive electrode active material, carbon black as a conductive agent, and fluorocarbon resin powder as a binder were mixed in a mass ratio of 90:5:5 to obtain a positive electrode material mixture, which was then formed into a coin-shaped body 10 mm in diameter and 0.5 mm in thickness. The formed body was then dried at 200° C. for 24 hours to obtain a positive electrode 1.

$Li_4Ti_5O_{12}$ as a negative electrode active material, graphite as a conductive agent, and polyacrylic acid as a binder were mixed in a mass ratio of 80:15:5 to obtain a negative electrode material mixture, which was then formed into a coin-shaped body 11 mm in diameter and 0.5 mm in thickness. The formed body was then dried at 150° C. for 24 hours to obtain a negative electrode 2.

With use of the positive electrode 1 and the negative electrode 2, a coin-shaped battery (Battery 1) as in FIG. 1 was produced. The battery dimensions were 16 mm in outer diameter and 1.6 mm in height. In producing the battery, a non-woven polypropylene fabric was used for a separator 3 and stainless steel was used for a battery case 4 and a sealing plate 5. On the inner surface of the battery case 4 and that of the sealing plate 5, a coating of conductive carbon was formed as a current-collecting layer (not illustrated). To remove moisture from the coating, the battery case 4 and the sealing plate 5 were used after drying at 150° C. for 6 hours.

For a gasket material, a first component was used 100%. The first component was obtained by conducting 10 times, a melting treatment in which a PFA resin (MFR: 30 g/10 min) as a virgin material was melted by heating at 350° C. for 2 minutes and then cooled for solidification. The 10$^{th}$ melting treatment was conducted inside an injector provided in an injection molding machine. Thereafter, a gasket was formed using the molding machine.

The heating time at the melting temperature was controlled, so that the respective heating times in the following examples and comparative examples would be about the same as that for Battery 1.

To prepare an electrolyte, $LiPF_6$ as a supporting salt was dissolved at a concentration of 1 mol/L in a non-aqueous solvent being a mixture of propylene carbonate, ethylene carbonate, and dimethoxyethane in a mass ratio of 1:1:1.

Battery 2

Battery 2 was produced as with Battery 1, except that 100% of the gasket material was a PFA resin having been subjected twice to the melting treatment with heating at 310° C.

Battery 3

Battery 3 was produced as with Battery 1, except that 100% of the gasket material was a PFA resin having been subjected twice to the melting treatment with heating at 450° C.

Battery 4

Battery 4 was produced as with Battery 1, except that 100% of the gasket material was a PFA resin having been subjected 20 times to the melting treatment with heating at 310° C.

Battery 5

Battery 5 was produced as with Battery 1, except that 100% of the gasket material was a PFA resin having been subjected 20 times to the melting treatment with heating at 450° C.

Battery 6

Battery 6 was produced as with Battery 1, except that the gasket material was a mixture of 30 mass % of a first component, i.e., a PFA resin having been subjected twice to the melting treatment with heating at 310° C., and 70 mass % of a second component, i.e., a PFA resin having been subjected only once to the melting treatment with heating at 310° C.

Specifically, a mixture of 30 mass % of a PFA resin having been subjected only once to the melting treatment with heating at 310° C. and 70 mass % of a PFA resin as a virgin material not having been subjected even once to the melting treatment, was prepared. The mixture was then subjected one more time to the melting treatment with heating at 310° C., inside the injector. Thereafter, a gasket was produced using the molding machine. Except that the resultant gasket was used, Battery 6 was produced as with Battery 1.

Battery 7

Battery 7 was produced as with Battery 1, except that the gasket material was a mixture of 30 mass % of a first component, i.e., a PFA resin having been subjected 20 times to the melting treatment with heating at 450° C., and 70 mass % of a second component, i.e., a PFA resin having been subjected only once to the melting treatment with heating at 450° C.

Specifically, a mixture of 30 mass % of a PFA resin having been subjected 19 times to the melting treatment with heating at 450° C. and 70 mass % of a PFA resin as a virgin material not having been subjected even once to the melting treatment, was prepared. The mixture was then subjected one more time to the melting treatment at 450° C., inside the injector. Thereafter, a gasket was produced using the molding machine. Except that the resultant gasket was used, Battery 7 was produced as with Battery 1.

Comparative Battery A

Comparative Battery A was produced as with Battery 1, except that 100% of the gasket material was a PFA resin having been subjected twice to the melting treatment with heating at 305° C.

Comparative Battery B

Comparative Battery B was produced as with Battery 1, except that 100% of the gasket material was a PFA resin having been subjected only once to the melting treatment with heating at 310° C.

Comparative Battery C

Comparative Battery C was produced as with Battery 1, except that 100% of the gasket material was a PFA resin having been subjected 20 times to the melting treatment with heating at 460° C.

Comparative Battery D

Comparative Battery D was produced as with Battery 1, except that 100% of the gasket material was a PFA resin having been subjected 21 times to the melting treatment with heating at 450° C.

Comparative Battery E

Comparative Battery E was produced as with Battery 1, except that 100% of the gasket material was a PFA resin having been subjected only once to the melting treatment with heating at 450° C.

Comparative Battery F

Comparative Battery F was produced as with Battery 1, except that 100% of the gasket material was a PFA resin having been subjected twice to the melting treatment with heating at 460° C.

Comparative Battery G

Comparative Battery G was produced as with Battery 1, except that 100% of the gasket material was a PFA resin having been subjected 20 times to the melting treatment with heating at 305° C.

Comparative Battery H

Comparative Battery H was produced as with Battery 1, except that 100% of the gasket material was a PFA resin having been subjected 21 times to the melting treatment with heating at 310° C.

Batteries 1 to 7 are examples and Comparative Batteries A to H are comparative examples.

Twenty batteries were produced for each of the batteries of the examples and comparative examples, and were charged at a constant voltage of 2.6 V for 24 hours (protective resistance: 51Ω). Then, for 10 of the 20 batteries, their respective discharge capacities immediately after charge were measured and their average was obtained.

The remaining 10 batteries were stored for 70 days in a high temperature and high humidity environment at a temperature of 85° C. and a humidity of 90%; and then charged under conditions similar to initial conditions. Thereafter, their respective discharge capacities were measured and their average was obtained.

Here, constant resistance discharge was conducted at 20 kΩ until 1.5 V to obtain the discharge capacity.

Moreover, the percentage (%) of the average discharge capacity of the battery after storage in the high temperature and high humidity environment relative to the average discharge capacity of the battery immediately after charge, was calculated as the capacity remaining rate (%). The 10 batteries after storage were disassembled, and the number of occurrences of cracks in the gasket was observed. These results are shown in Table 1.

TABLE 1

| Battery | Melting temperature (° C.) | Melting treatment (number of times) | Proportion of first component in mixture (%) | Capacity remaining rate (%) | Occurrence rate of cracking of gasket |
|---|---|---|---|---|---|
| Bat. 1 | 350 | 10 | 100 | 90 | 0/10 |
| Bat. 2 | 310 | 2 | 100 | 83 | 0/10 |
| Bat. 3 | 450 | 2 | 100 | 85 | 0/10 |
| Bat. 4 | 310 | 20 | 100 | 87 | 0/10 |
| Bat. 5 | 450 | 20 | 100 | 88 | 0/10 |
| Bat. 6 | 310 | 2 | 30 | 75 | 0/10 |
| Bat. 7 | 450 | 20 | 30 | 80 | 0/10 |
| Comp. Bat. A | 305 | 2 | 100 | 35 | 0/10 |
| Comp. Bat. B | 310 | 1 | 100 | 31 | 0/10 |
| Comp. Bat. C | 460 | 20 | 100 | 26 | 7/10 |
| Comp. Bat. D | 450 | 21 | 100 | 23 | 8/10 |
| Comp. Bat. E | 450 | 1 | 100 | 51 | 0/10 |
| Comp. Bat. F | 460 | 2 | 100 | 54 | 0/10 |
| Comp. Bat. G | 305 | 20 | 100 | 21 | 0/10 |
| Comp. Bat. H | 310 | 21 | 100 | 43 | 0/10 |

As evidenced by Table 1, in Batteries 1 to 7 each in which at least a part of the gasket material was a PFA resin having been subjected 2 to 20 times to the melting treatment with heating at 310° C. to 450° C., degradation of discharge capacity after high temperature and high humidity storage was suppressed more significantly, compared to Comparative Battery A in which the melting treatment was conducted twice with heating at 305° C., Comparative Battery B (melting treatment conducted only once with heating at 310° C.), Comparative Battery E (melting treatment conducted only once with heating at 450° C.), and Comparative Battery F (melting treatment conducted twice with heating at 460° C.). This is presumably because hydrophilicity of the gasket surface lowered due to the bonding of the end groups in the PFA resin; and entry of moisture from the outside due to moisture adsorption at the gasket surface was able to be suppressed.

Moreover, in Batteries 1 to 7, discharge capacity degradation after high temperature and high humidity storage was evidently suppressed more, compared to Comparative Battery C in which the melting treatment was conducted 20 times with heating at 460° C., Comparative Battery D (melting treatment conducted 21 times with heating at 450° C.), Comparative Battery G (melting treatment conducted 20 times with heating at 305° C.) and Comparative Battery H (melting treatment conducted 21 times with heating at 310° C.). Furthermore, in contrast to Batteries C and D in which cracks occurred in the gaskets, in Batteries 1 to 7, no cracks were observed in the gaskets. From the above, Batteries 1 to 7 were evidently able to achieve improvement in humidity resistance characteristics, without any decline in the mechanical strength of the gasket due to reduction in molecular weight. This is because the melting treatment conducted 2 to 20 times with heating at 310° C. to 450° C. allowed the main chain to divide and the end groups to bond together, simultaneously. This presumably enabled suppression of apparent reduction in molecular weight while increasing the hydrophobicity of the gasket, whereby the mechanical strength of the gasket was maintained.

One hundred percent of the gasket material is preferably a PFA resin having been subjected 2 to 20 times to the melting treatment with heating at 310° C. to 450° C. However, the effect of the PFA resin is evidently obtained even when only a part of the gasket material is the PFA resin.

Example 2

Battery 8

Battery 8 was produced as with Battery 1, except that the gasket material was a mixture of 80 mass % of a first component, i.e., a PFA resin having been subjected 10 times to the melting treatment with heating at 350° C., and 20 mass % of a second component, i.e., a PFA resin having been subjected only once to the melting treatment with heating at 350° C.

Specifically, a mixture of 80 mass % of a PFA resin having been subjected 9 times to the melting treatment with heating at 350° C. and 20 mass % of a PFA resin as a virgin material not having been subjected even once to the melting treatment, was prepared. Then, as with Batteries 6 and 7, the mixture was subjected one more time to the melting treatment with heating at 350° C., thereby to produce a gasket. Except that the resultant gasket was used, Battery 8 was produced as with Battery 1.

Batteries 9 to 15

Batteries 9 to 15 were produced as with Battery 8, except that the respective mix proportions of the first component, i.e., the PFA resin having been subjected 9 times to the melting treatment with heating at 350° C., and the second component, i.e., the PFA resin as the virgin material, were changed as shown in Table 2.

Comparative Battery I

Comparative Battery I was produced as with Battery 1, except that 100% of the gasket material was a second component, i.e., a PFA resin having been subjected only once to the melting treatment with heating at 350° C.

Batteries 8 to 15 are examples and Comparative Battery I is a comparative example.

Batteries 8 to 15 and Comparative Battery I were evaluated as in Example 1. The results are shown in Table 2.

TABLE 2

| Battery | Melting temperature (° C.) | Melting treatment (number of times) | Proportion of first component in mixture (%) | Capacity remaining rate (%) | Occurrence rate of cracking of gasket |
|---|---|---|---|---|---|
| Bat. 1 | 350 | 10 | 100 | 90 | 0/10 |
| Bat. 8 | 350 | 10 | 80 | 91 | 0/10 |
| Bat. 9 | 350 | 10 | 60 | 89 | 0/10 |
| Bat. 10 | 350 | 10 | 40 | 87 | 0/10 |
| Bat. 11 | 350 | 10 | 20 | 85 | 0/10 |
| Bat. 12 | 350 | 10 | 10 | 81 | 0/10 |
| Bat. 13 | 350 | 10 | 7 | 76 | 0/10 |
| Bat. 14 | 350 | 10 | 5 | 73 | 0/10 |
| Bat. 15 | 350 | 10 | 1 | 66 | 0/10 |
| Comp Bat. I | 350 | 1 | 0 | 42 | 0/10 |

As evidenced by Table 2, in Batteries 1 and 8 to 12 each in which the mixture included 10% or more of the first component, i.e., the PFA resin having been subjected 10 or more times to the melting treatment, the respective capacity remaining rates after storage in the high temperature and high humidity environment were particularly high, exceeding 80%.

Example 3

Batteries 16 to 23

Batteries 16 to 23 were produced as with Battery 1, except that PFA resins as virgin materials having different MFRs of 18 g/10 min to 42 g/10 min were used. This was followed by an evaluation conducted as in Example 1. The results are shown in Table 3.

TABLE 3

| Battery | MFR of virgin material (g/10 min) | Melting treatment (number of times) | Capacity remaining rate (%) | Occurrence rate of cracking of gasket |
|---|---|---|---|---|
| Bat. 1 | 30 | 10 | 90 | 0/10 |
| Bat. 16 | 18 | 10 | 78 | 0/10 |
| Bat. 17 | 20 | 10 | 80 | 0/10 |
| Bat. 18 | 23 | 10 | 85 | 0/10 |
| Bat. 19 | 26 | 10 | 87 | 0/10 |
| Bat. 20 | 34 | 10 | 88 | 0/10 |
| Bat. 21 | 37 | 10 | 86 | 0/10 |
| Bat. 22 | 40 | 10 | 80 | 0/10 |
| Bat. 23 | 42 | 10 | 76 | 0/10 |

As evidenced by Table 3, in Batteries 1 and 17 to 22 each in which the virgin material had an MFR of 20 to 40 g/10 min, the respective capacity remaining rates after storage in the high temperature and high humidity environment were high, exceeding 80%.

Example 4

Battery 24

Battery 24 was produced as with Battery 1, except that a solution, prepared in advance by diluting butyl rubber with toluene, was applied between the battery case 4 and the gasket 6 and between the sealing plate 5 and the gasket 6; and then the toluene was made to evaporate, thereby to interpose the butyl rubber as a sealant at each of the bonding interfaces.

Battery 25

Battery 25 was produced as with Battery 24, except that styrene-butadiene rubber (SBR) was used instead of butyl rubber.

Battery 26

Battery 26 was produced as with Battery 24, except that fluorocarbon rubber was used instead of butyl rubber.

Battery 27

Battery 27 was produced as with Battery 1, except that blown asphalt (pitch) was used instead of butyl rubber.

Batteries 24 to 27 were evaluated as in Example 1. The results are shown in Table 4.

TABLE 4

| Battery | Sealant | Melting treatment (number of times) | Capacity remaining rate (%) | Occurrence rate of cracking of gasket |
|---|---|---|---|---|
| Bat. 1 | None | 10 | 90 | 0/10 |
| Bat. 24 | Butyl rubber | 10 | 96 | 0/10 |

TABLE 4-continued

| Battery | Sealant | Melting treatment (number of times) | Capacity remaining rate (%) | Occurrence rate of cracking of gasket |
|---|---|---|---|---|
| Bat. 25 | Styrene-butadiene rubber | 10 | 94 | 0/10 |
| Bat. 26 | Fluorocarbon rubber | 10 | 98 | 0/10 |
| Bat. 27 | Blown asphalt (pitch) | 10 | 90 | 0/10 |

As evidenced by Table 4, Batteries 24, 25, and 26 which used butyl rubber, styrene-butadiene rubber, and fluorocarbon rubber, respectively, exhibited higher capacity remaining rates than Battery 1 which had no application of a sealant.

Example 5

Battery 28

Electrolytic manganese dioxide heat treated at 400° C. for 8 hours as a positive electrode active material, carbon black as a conductive agent, and fluorocarbon resin powder as a binder were mixed in a mass ratio of 90:5:5 to obtain a positive electrode material mixture, which was then molded into a pellet 16 mm in diameter and 1.9 mm in thickness. The molded body was then dried at 250° C. for 24 hours to obtain a positive electrode 1 for use.

For a negative electrode 2, a round piece 16 mm in diameter was punched out from a 0.58 mm-thick lithium metal plate.

With use of the positive electrode 1 and the negative electrode 2, a coin-shaped battery (Battery 28) as in FIG. 1 was produced. The battery dimensions were 20 mm in outer diameter and 3.2 mm in height. In producing the battery, a non-woven polypropylene fabric was used for a separator 3 and stainless steel was used for a battery case 4 and a sealing plate 5. On the inner surface of the battery case 4 and that of the sealing plate 5, a coating of conductive carbon was formed as a current-collecting layer (not illustrated). To remove moisture from the coating, the battery case 4 and the sealing plate 5 were used after drying at 150° C. for 6 hours.

For a gasket material, a PFA resin having been subjected 10 times to the melting treatment with heating at 350° C. was used 100%. The MFR of the PFA resin as a virgin material was 30 g/10 min.

As with Battery 24, butyl rubber was interposed as a sealant between the battery case 4 and the gasket 6 and between the sealing plate 5 and the gasket 6.

To prepare an electrolyte, $LiClO_4$ as a supporting salt was dissolved at a concentration of 0.5 mol/L, in a non-aqueous solvent obtained by mixing propylene carbonate and dimethoxyethane in a mass ratio of 1:1.

Comparative Battery J

Comparative Battery J was produced as with Battery 28, except that 100% of the gasket material was a PFA resin having been subjected only once to the melting treatment with heating at 350° C.

Battery 28 is an example and Comparative Battery J is a comparative example.

Twenty batteries were produced for each of the batteries of the example and comparative example. The initial voltage was about 3.2 V. Then, for 10 of the 20 batteries, their respective discharge capacities immediately after production were measured and their average was obtained. The remaining 10 batteries were stored for 70 days in a high temperature and high humidity environment at a temperature of 85° C. and a humidity of 90%; and then, their respective discharge capacities were measured and their average was obtained.

Here, constant resistance discharge was conducted at 15 kΩ until 2.0 V to obtain the discharge capacity.

Moreover, the percentage of the average discharge capacity of the battery after storage in the high temperature and high humidity environment relative to the average discharge capacity of the battery immediately after production, was calculated as the capacity remaining rate (%).

Moreover, the 10 batteries after storage were disassembled, and the number of occurrences of cracks in the gasket was observed. These results are shown in Table 5.

TABLE 5

| Battery | Melting temperature (° C.) | Melting treatment (number of times) | Proportion of first component in mixture (%) | Capacity remaining rate (%) | Occurrence rate of cracking of gasket |
|---|---|---|---|---|---|
| Bat. 28 | 350 | 10 | 100 | 87 | 0/10 |
| Comp. Bat. J | 350 | 1 | 0 | 58 | 0/10 |

As evidenced by Table 5, compared to Comparative Battery J, Battery 28 exhibited a higher capacity remaining rate after storage in the high temperature and high humidity environment.

Example 6

Battery 29

Electrolytic manganese dioxide heat treated at 400° C. for 8 hours as a positive electrode active material, carbon powder as a conductive agent, and fluorocarbon resin powder as a binder were mixed in a mass ratio of 100:5:5 to prepare a positive electrode material mixture. Then, the positive electrode material mixture was applied to an expanded metal of stainless steel, followed by pressing of the resultant to be 0.38 mm in thickness, 20 mm in width, and 220 mm in length, thereby to obtain a positive electrode 11. The positive electrode 11 was used after drying at 250° C. for 24 hours to remove moisture therefrom.

For a negative electrode 12, a lithium metal foil in strip form, 0.15 mm in thickness, 18 mm in width, and 240 mm in length, was used.

With use of the positive electrode 11 and the negative electrode 12, a cylindrical battery (Battery 29) as in FIG. 2 was produced. The battery dimensions were 17 mm in outer diameter and 34 mm in height. A microporous polypropylene membrane was used for a separator 13, iron was used for a battery case 14, and stainless steel was used for a sealing plate 15.

The positive electrode 11 and the negative electrode 12, both in strip form, were wound with the separator 13 interposed therebetween, thereby to produce an electrode assembly. The negative electrode 12 and the battery case 14 were connected via a negative electrode lead 17. The sealing plate 15 provided with a positive terminal was attached at the upper portion of the battery case 14. The positive electrode 11 and the sealing plate 15 were connected via a positive electrode lead 18. An upper insulating plate 19a and a lower insulating plate 19b were disposed at the upper portion and the lower portion, respectively, of the electrode assembly.

For a gasket material, a PFA resin having been subjected 10 times to the melting treatment with heating at 350° C. was used 100%. The MFR of the PFA resin as a virgin material was 30 g/10 min.

As with Battery 24, butyl rubber was interposed as a sealant between the battery case 14 and the gasket 16 and between the sealing plate 15 and the gasket 16.

To prepare an electrolyte, lithium trifluoromethanesulfonate as a supporting salt was dissolved at a concentration of 1 mol/L, in a non-aqueous solvent obtained by mixing propylene carbonate and 1,2-dimethoxyethane in a mass ratio of 1:1.

Two grams of the electrolyte was injected into the battery case 14 with the electrode assembly inserted therein. Thereafter, the edge portion of the battery case 14 was crimped to the peripheral edge portion of the sealing plate 15, with the gasket 16 in between, thereby to seal the battery.

Comparative Battery K

Comparative Battery K was produced as with Battery 29, except that 100% of the gasket material was a PFA resin having been subjected only once to the melting treatment with heating at 350° C.

Battery 29 is an example and Comparative Battery K is a comparative example.

Twenty batteries were produced for each of the batteries of the example and comparative example. The initial voltage was about 3.2 V.

For 10 of the 20 batteries, their respective discharge capacities immediately after production were measured and their average was obtained. The remaining 10 batteries were stored for 70 days in a high temperature and high humidity environment at a temperature of 85° C. and a humidity of 90%; and then, their respective discharge capacities were measured and their average was obtained.

Here, constant resistance discharge was conducted at 0.5 A until 2.0 V to obtain the discharge capacity.

Moreover, the percentage of the average discharge capacity of the battery after storage in the high temperature and high humidity environment relative to the average discharge capacity of the battery immediately after production, was calculated as the capacity remaining rate (%).

Moreover, the 10 batteries after storage were disassembled, and the number of occurrences of cracks in the gasket was observed. These results are shown in Table 6.

TABLE 6

| Battery | Melting temperature (° C.) | Melting treatment (number of times) | Proportion of first component in mixture (%) | Capacity remaining rate (%) | Occurrence rate of cracking of gasket |
|---|---|---|---|---|---|
| Bat. 29 | 350 | 10 | 100 | 93 | 0/10 |
| Comp. Bat. K | 350 | 1 | 0 | 51 | 0/10 |

As evidenced by Table 6, compared to Comparative Battery K, Battery 29 exhibited a higher capacity remaining rate even after storage in the high temperature and high humidity environment.

INDUSTRIAL APPLICABILITY

The non-aqueous electrolyte battery of the present invention is effective as the power supply of the main power source for electronic devices and other devices.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

EXPLANATION OF REFERENCE NUMERALS 1, 11 positive electrode
2, 12 negative electrode
3, 13 separator
4, 14 battery case
5, 15 sealing plate
6, 16 gasket
17 negative electrode lead
18 positive electrode lead
19a upper insulating plate
19b lower insulating plate

The invention claimed is:

1. A non-aqueous electrolyte battery comprising:
a power-generating element; and
a battery container configured to house the power-generating element,
the power-generating element including:
a positive electrode;
a negative electrode;
a separator interposed between the positive electrode and the negative electrode; and
a non-aqueous electrolyte,
the battery container including:
a battery case having an opening;
a sealing plate configured to close the opening; and
a gasket interposed between the battery case and the sealing plate,
the gasket comprising a PFA resin being a copolymer of tetrafluoroethylene and perfluoroalkyl vinyl ether,
at least a part of the PFA resin having undergone a melting treatment 2 to 20 times to be a first component, and
the melting treatment including melting the PFA resin by heating at a melting temperature of 310° C. to 450° C. and then cooling the PFA resin back to a solid.

2. The non-aqueous electrolyte battery in accordance with claim 1,
wherein the PFA resin further includes a second component in addition to the first component, and
an amount of the second component relative to the total of the first component and the second component is 90 mass % or less.

3. The non-aqueous electrolyte battery in accordance with claim 1, wherein a melt flow rate of the PFA resin in a state of a virgin material prior to the melting treatment, is 20 g/10 min to 40 g/10 min.

4. The non-aqueous electrolyte battery in accordance with claim 1, wherein a sealant is provided at a first bonding interface between the battery case and the gasket and at a second bonding interface between the sealing plate and the gasket, and the sealant includes a rubber component.

5. The non-aqueous electrolyte battery in accordance with claim 2, wherein a melt flow rate of the PFA resin in a state of a virgin material prior to the melting treatment, is 20 g/10 min to 40 g/10 min.

6. The non-aqueous electrolyte battery in accordance with claim 2, wherein a sealant is provided at a first bonding interface between the battery case and the gasket and at a second bonding interface between the sealing plate and the gasket, and the sealant includes a rubber component.

7. The non-aqueous electrolyte battery in accordance with claim 3, wherein a sealant is provided at a first bonding interface between the battery case and the gasket and at a second bonding interface between the sealing plate and the gasket, and the sealant includes a rubber component.

8. The non-aqueous electrolyte battery in accordance with claim 2, wherein the second component is a PFA resin having undergone the melting treatment only once.

9. A non-aqueous electrolyte battery comprising:
a power-generating element; and
a battery container configured to house the power-generating element, the power-generating element including:
a positive electrode;
a negative electrode;
a separator interposed between the positive electrode and the negative electrode; and
a non-aqueous electrolyte, the battery container including:
a battery case having an opening;
a sealing plate configured to close the opening; and
a gasket interposed between the battery case and the sealing plate, the gasket comprising a first PFA resin being a copolymer of tetrafluoroethylene and perfluoroalkyl vinyl ether, the first PFA resin having undergone a melting treatment 2 to 20 times, and the melting treatment including melting a PFA resin by heating at a melting temperature of 310° C. to 450° C. and then cooling the PFA resin back to a solid.

10. The non-aqueous electrolyte battery in accordance with claim 9, wherein:

the gasket further comprises a second PFA different from the first PFA, and an amount of the second PFA relative to a total of the first PFA and the second PFA is 90 mass % or less.

11. The non-aqueous electrolyte battery in accordance with claim 10, wherein the second PFA has undergone the melting treatment only once.

* * * * *